UNITED STATES PATENT OFFICE.

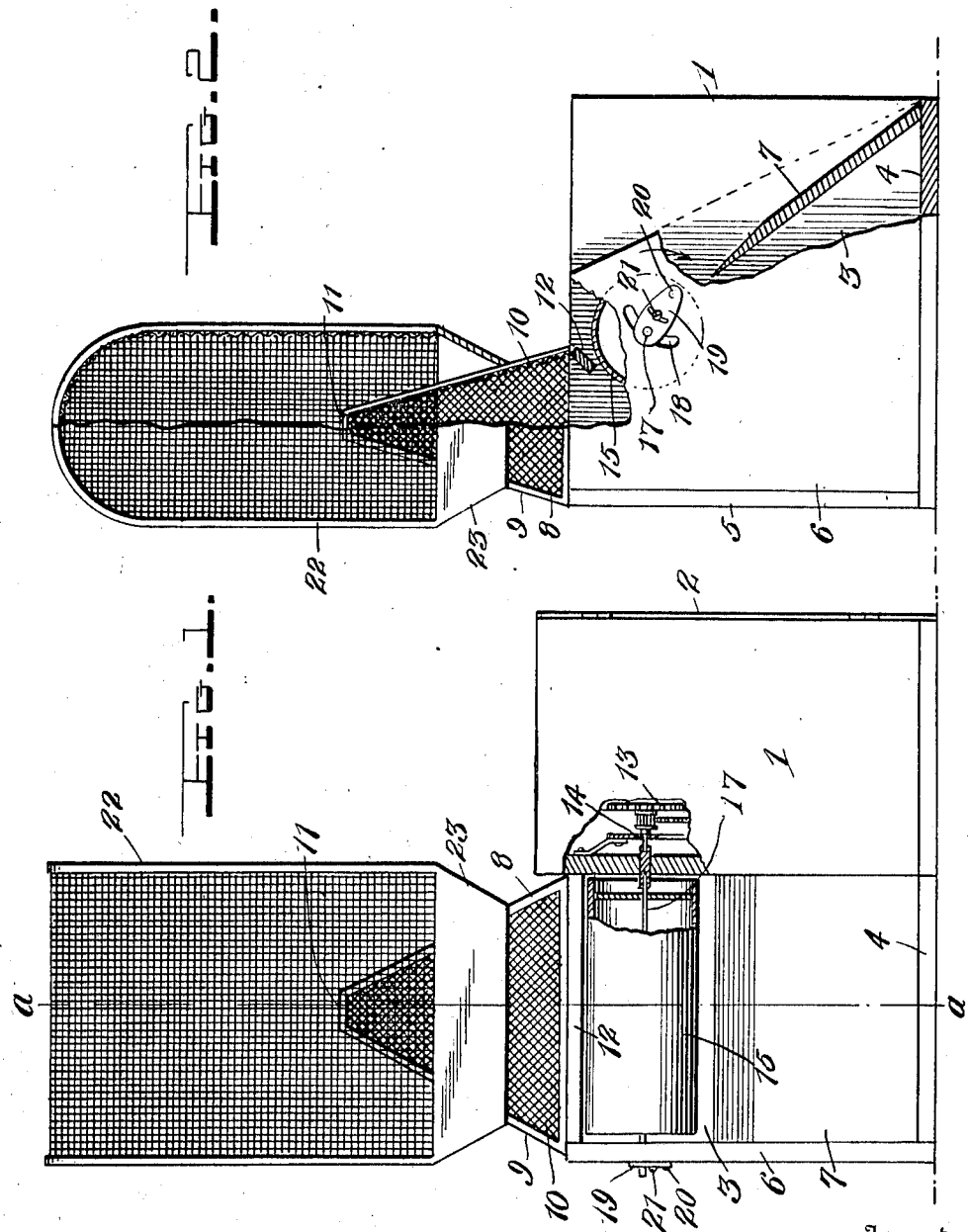

JOHN E. JORDAN, OF LOTT, TEXAS.

FLY-TRAP.

1,019,899. Specification of Letters Patent. Patented Mar. 12, 1912.

Application filed May 1, 1911. Serial No. 624,287.

*To all whom it may concern:*

Be it known that I, JOHN E. JORDAN, a citizen of the United States, residing at Lott, in the county of Falls and State of Texas, have invented certain new and useful Improvements in Fly-Traps, of which the following is a specification, reference being had to the accompanying drawings.

This invention is an improved fly trap and consists in the construction, combination and arrangement of devices hereinafter described and claimed.

In the accompanying drawings Figure 1 is a front elevation, partly in section, of a fly trap constructed in accordance with my invention; and Fig. 2 is partly an end elevation and partly a vertical sectional view of the same on the plane indicated by the line $a$—$a$ of Fig. 1.

In accordance with my invention I provide a casing 1 of suitable size and shape which is here shown as provided with a hinged door 2 at one side. On one side of the casing is a chamber 3 which is formed by an extension 4 of the bottom of the casing, vertical walls 5 and 6, and an inclined front wall 7 which converges upwardly toward the rear wall 5. Across the upper side of the chamber, at the rear thereof, extends a pyramidal entrance cage 8 which is made of a suitable frame 9 of pyramidal form and walls 10 of wire screen or other suitable fabric. At the apex of the entrance cage is an opening 11. The base of the frame 9 bears on the upper sides of the walls 5 and 6 and also on a cross bar 12 which connects the wall 6 with the opposing side wall of the casing 1 and is spaced from the upper edge of the inclined wall 7. The entrance cage may be secured by any suitable means at the top of the chamber and is preferably removably fixed in place.

A suitable motor 13, which is here indicated as a spring motor and may be made of any suitable construction, is provided with a shaft 14 which projects through an opening in the inner wall of the casing at a point between the bar and the upper side of the inclined wall 7 and has a socket. A cylinder 15 is provided with a central arbor, one end of which may be inserted in the socket of the shaft 14 for rotation therewith. From the center of the opposite end of the cylinder projects the other end of the arbor 17 which extends through an opening 18 in the wall 6, the said opening greatly exceeding the diameter of the arbor and the arbor has its bearing in a plate 19 which is pivoted on the outer side of the wall 6 as at 20. The said plate may be secured in place by a pin 21 and enables the cylinder to be disconnected, when desired, from the shaft 14. To thus disconnect the cylinder the bearing plate is first removed from the arbor 17 thus freeing the outer end of the cylinder and the inner end of the cylinder shaft may then be disconnected from the motor shaft.

The cylinder is located in the space between the inclined wall 7 and the bar 12 and is slightly spaced from the said bar. When the trap is to be used the cylinder should be coated with molasses or some other bait which will attract the flies and cause them to alight on the cylinder. The cylinder is slowly revolved by the action of the motor in the direction indicated by the arrow in Fig. 2 so that the flies which alight on the cylinder are carried by the rotation thereof into the chamber. The bar 12 presents a narrowed scraping lower edge just above the cylinder and as the flies carried by the cylinder reach the bar they either voluntarily fly or are scraped therefrom by the bar. The entrance cage 8 immediately above the chamber being of foraminous material and hence being thoroughly lighted the flies in obedience to their instinct will fly upwardly in the said entrance cage and alight on the walls thereof and crawl upwardly therein through the opening at the upper end thereof. A removable cage 22 is also provided, the walls of which are made of wire fabric or other suitable foraminous material. This cage is of suitable size and is provided at its lower end, which is open, with a base frame 23 which fits on the walls of the entrance cage above the lower end of the latter and enables the cage 22 to be detachably mounted on the entrance cage and held in place thereon by its own weight. As the flies issue from the opening in the apex of the entrance cage they pass into the cage 22 and the latter can be removed at any time by simply lifting it from the entrance cage, in order to destroy the flies and permit the said cage to be cleaned. The cage 22 is somewhat contracted at its lower, open end and when it is lifted from the entrance cage of the trap the flies, which remain in the upper portion of the cage, will not find their way out through the lower open end thereof while the cage is being taken to the place where it is desired to destroy the flies.

Having thus described my invention I claim:

1. A fly trap, including a casing open at the top, a bar extending across the casing from one side to the other at the top and spaced from one side of the casing, a revoluble drum mounted in the casing, the casing being provided with an inclined wall leading upwardly and inwardly to the drum with its inner and upper edge spaced therefrom, the drum being located between the inner edge of the inclined wall and the side bar, an upwardly tapering entrance cage resting on the top of the box and having one side engaging said bar, means for rotating said drum, and a removable cage fitting detachably upon the entrance cage above the lower end of the latter, for the purpose specified.

2. A fly trap of the character described, including a casing open at the top and having an inwardly and upwardly inclined wall, a bar extending across the top and spaced from one side of the casing, a revoluble drum mounted in the casing between the inner edge of the inclined wall and the bar and spaced from said edge and bar, the distance between the drum and the edge of the wall being greater than the distance between the drum and the adjoining edge of the bar, means for rotating said drum, a pyramidal entrance cage supported at its lower end on said bar and the adjoining upper edges of the casing, and a detachable cage having a contracted lower end adapted to fit the entrance cage above the bottom of the latter, the detachable cage and entrance cage being provided with foraminous walls, the disposition of the detachable cage on the entrance cage exposing a portion of the foraminous walls of the latter below the detachable cage.

In testimony whereof I hereunto affix my signature in the presence of two witnesses.

JOHN E. JORDAN.

Witnesses:
G. W. LEHMAN,
R. W. BOZEMAN.